United States Patent Office 2,739,109
Patented Mar. 20, 1956

2,739,109

BLACK CHROMIUM-NICKEL-VANADIUM ELECTRODEPOSITS

Martin F. Quaely, Montclair, N. J., assignor to Westinghouse Electric Corporation, East Pittsburgh, Pa., a corporation of Pennsylvania No Drawing. Application June 14, 1952, Serial No. 293,682

7 Claims. (Cl. 204—43)

This invention relates to the electrodeposition of black coatings of chromium-nickel-vanadium.

It has been desirable to produce black metallic electrodeposits on members. Such deposits should be characterized by adherence and stability when exposed to elevated temperatures, particularly in a vacuum. These deposits are particularly desirable for use on elements in electron tubes and similar devices, where high thermal emissivity is necessary.

The object of this invention is to provide an electrolyte comprising an aqueous solution of a chromium compound, a nickel compound and a vanadium compound that will electroplate a black conjoint deposit containing these three metals.

A further object of the invention is to provide a process for plating on members a complex, black coating comprising chromium, nickel and vanadium.

Other objects of the invention will, in part, be obvious, and will, in part, appear hereinafter.

I have discovered a novel process for depositing black coatings on members. This process entails the use of an aqueous electrolyte comprising essentially from 150 to 350 grams per liter of chromic acid ($CrO_3$), and from 13 to 60 grams per liter of nickel chloride ($NiCl_2$), and from 2 to 10 grams per liter of vanadium present as a soluble compound thereof, the balance of the electrolyte being water. The electrolyte may be modified by adding up to 10 grams per liter of a soluble organic acid therein. Suitable organic acids are acetic acid, formic acid, citric acid, oxalic acid and propionic acid, and mixtures of any two or more. Such acids improve the plating operation.

Members to be plated in the electrolyte are made the cathode in the electrolyte. The anode in the electrolyte may comprise lead, graphite, or other insoluble material. An electrical current is applied through such electrodes at a current density of from 400 to 2,000 A. S. F. (amperes per square foot). A potential of 12 to 15 volts is required for this purpose. The high current densities generate considerable heat and, therefore, cooling coils supplied with water or a refrigerant are disposed therein to keep the temperature below 40° C., since above this temperature the coatings deposited are not black, but gray, and are not as effective for the intended purpose.

A soluble compound of vanadium may be prepared by dissolving vanadium powder in concentrated nitric acid in an amount just sufficient to effect solution thereof. However, vanadium oxide, a vanadate, a vanadium halide or other vanadium compound adequately soluble in water, may be the source of the metallic vanadium.

It is preferred that the metal salts be added to the electrolyte in such proportion that the metallic components of the electrolyte be in the approximate weight ratio of 20 parts of chromium, from 1.5 to 7 parts of nickel, and about ½ to 2.5 parts of vanadium. The following examples are illustrative of the practice of the invention:

*Example I*

An aqueous electrolyte was prepared containing in each liter 200 grams of chromic acid, 80 grams of nickel chloride hexahydrate, and 5 grams of vanadium, introduced as vanadium nitrate, and 6½ grams of glacial acetic acid were added to each liter of electrolyte. A steel plate was made the cathode in this electrolyte and a plating current at a density of 900 amperes per square foot was applied to the member. A uniform black coating was plated out upon all of the surfaces of the member in 2 minutes. By continuing the plating for 5 minutes, a thicker coating of approximately one mil was obtained. However, all of the coatings were of a deep uniform black appearance. After removal from the electrolyte and washing, the coatings were heated to a dull red heat and immediately quenched in water. This treatment did not affect the adherence of the coating to any observable degree.

*Example II*

A plating electrolyte was prepared having the following composition per liter; chromic oxide—200 grams; nickel chloride hexahydrate—20 grams; vanadium (introduced as vanadium nitrate)—2 grams; acetic acid—6 grams. A member was plated in this electrolyte at a current density of 1,000 A. S. F. In 5 minutes there was deposited on the member a uniform black coating. The coating was resistant to high temperatures of up to 800° C., and even when heated over a gas flame, the color changed only slightly from a jet black to a gray black. However, heating in a vacuum to a red heat did not affect the color significantly.

The conjoint complex nickel, chromium and vanadium black electrodeposits of this invention comprise mainly the three metals; however, small amounts of the oxides of these metals are present in the electrodeposits. The metals plate out in substantially the proportions present in the electrolyte.

The coatings of the present invention are suitable for application in vacuum tubes and the like. Rotating anodes in X-ray tubes may be coated with the black electrodeposits of the present invention.

It is intended that all matter contained in the above description shall be deemed to be illustrative and not limiting.

I claim as my invention:

1. An aqueous electroplating electrolyte comprising essentially from 150 to 350 grams per liter of chromic acid, from 13 to 60 grams per liter of nickel chloride ($NiCl_2$) and from 2 to 10 grams per liter of vanadium present as a soluble compound, the ratio of chromium to nickel to vanadium being 20:1.5 to 7:½ to 2½ parts by weight.

2. An aqueous electroplating electrolyte comprising essentially from 150 to 350 grams per liter of chromic acid, from 13 to 60 grams per liter of nickel chloride ($NiCl_2$), from 2 to 10 grams per liter of vanadium present as a soluble compound, and from 3 to 10 grams per liter of a soluble carboxylic acid, the ratio of chromium to nickel to vanadium being 20:1.5 to 7:½ to 2½ parts by weight.

3. An aqueous electroplating electrolyte comprising essentially from 150 to 350 grams per liter of chromic acid, from 13 to 60 grams per liter of nickel chloride ($NiCl_2$), from 2 to 10 grams per liter of vanadium present as a soluble compound, and from 3 to 10 grams per liter of a glacial acetic acid, the ratio of chromium to nickel to vanadium being 20:1.5 to 7:½ to 2½ parts by weight.

4. In the process of electrodepositing an adherent and highly heat-resistant black finish on a member, the steps comprising making the member a cathode in an aqueous electroplating electrolyte comprising essentially from 150 to 350 grams per liter of chromic acid, from 13 to 60 grams per liter of nickel chloride (NiCl$_2$) and from 2 to 10 grams per liter of vanadium present as a soluble compound, the ratio of chromium to nickel to vanadium being 20:1.5 to 7:½ to 2½ parts by weight and passing a plating electrical current through the member at a density of from 400 to 2,000 A. S. F., the electrolyte being maintained at a temperature of below 40° C.

5. In the process of electrodepositing an adherent and highly heat-resistant black finish on a member, the steps comprising making the member a cathode in an aqueous electroplating solution comprising essentially from 150 to 350 grams per liter of chromic acid, from 13 to 60 grams per liter of nickel chloride (NiCl$_2$), from 2 to 10 grams per liter of vanadium present as a soluble compound, and from 3 to 10 grams per liter of a soluble carboxylic acid, the ratio of chromium to nickel to vanadium being 20:1.5 to 7:½ to 2½ parts by weight and passing a plating electrical current through the member at a density of from 400 to 2,000 A. S. F., the electrolyte being maintained at a temperature of below 40° C.

6. In the process of electrodepositing an adherent and highly heat-resistant black finish on a member, the steps comprising making the member a cathode in an aqueous electroplating solution comprising essentially from 150 to 350 grams per liter of chromic acid, from 13 to 60 grams per liter of nickel chloride (NiCl$_2$), from 2 to 10 grams per liter of vanadium present as a soluble compound, and from 3 to 10 grams per liter of a glacial acetic acid, the ratio of chromium to nickel to vanadium being 20:1.5 to 7:½ to 2½ parts by weight and passing a plating electrical current through the member at a density of from 400 to 2,000 A. S. F., the electrolyte being maintained at a temperature of below 40° C.

7. A member having on its surface an adherent, highly heat-resistant black coating comprising an electrodeposited complex layer consisting of 20 parts by weight of chromium, from 1.5 to 7 parts by weight of nickel and from ½ to 2.5 parts by weight of vanadium.

References Cited in the file of this patent

UNITED STATES PATENTS

| | | |
|---|---|---|
| 1,542,549 | Grah | June 16, 1925 |
| 1,698,936 | Chesterfield | Jan. 15, 1929 |
| 1,795,459 | Westbrook | Mar. 10, 1931 |
| 1,975,239 | Ungelenk et al. | Oct. 2, 1934 |
| 2,623,847 | Gilbert et al. | Dec. 30, 1952 |

OTHER REFERENCES

Skalozubov et al.: Chemical Abstracts, vol. 35, (1941), pp. 1323–24 (Two articles.)